United States Patent
Sun et al.

(10) Patent No.: US 11,674,112 B1
(45) Date of Patent: Jun. 13, 2023

(54) DOUBLE LAYER DETERGENT TABLET AND PREPARATION METHOD THEREOF

(71) Applicant: Guangzhou Joyson Cleaning Products Co., Ltd., Guangdong (CN)

(72) Inventors: Jianfeng Sun, Guangdong (CN); Fenglei Li, Guangdong (CN); Jianjia Zhong, Guangdong (CN); Yan Li, Guangdong (CN); Dongqian Wu, Guangdong (CN); Min Sun, Guangdong (CN)

(73) Assignee: Guangzhou Joyson Cleaning Products Co., Ltd., Guangdong (CN)

( * ) Notice: Subject to any disclaimer, the term of this patent is extended or adjusted under 35 U.S.C. 154(b) by 0 days.

(21) Appl. No.: 18/091,669

(22) Filed: Dec. 30, 2022

(51) Int. Cl.
| | |
|---|---|
| C11D 17/00 | (2006.01) |
| C11D 17/04 | (2006.01) |
| C11D 3/37 | (2006.01) |
| C11D 3/20 | (2006.01) |
| C11D 1/831 | (2006.01) |
| C02F 5/12 | (2023.01) |
| C02F 5/10 | (2023.01) |

(52) U.S. Cl.
CPC ............ *C11D 3/3753* (2013.01); *C02F 5/10* (2013.01); *C02F 5/12* (2013.01); *C11D 1/831* (2013.01); *C11D 3/2065* (2013.01); *C11D 3/3746* (2013.01); *C11D 17/0078* (2013.01)

(58) Field of Classification Search
None
See application file for complete search history.

(56) References Cited

U.S. PATENT DOCUMENTS

| 2006/0058212 A1* | 3/2006 | McNamee | C11D 17/049 510/276 |
| 2009/0137170 A1* | 5/2009 | Luoni | D06P 1/5257 8/115.6 |
| 2019/0390138 A1* | 12/2019 | Sivik | C11D 3/228 |

FOREIGN PATENT DOCUMENTS

| CN | 106916659 A | * | 7/2017 |
| CN | 113174297 A | * | 7/2021 |
| WO | WO 2012/107405 A1 | * | 8/2012 |
| WO | WO 2019/075142 A1 | * | 4/2019 |

OTHER PUBLICATIONS

CN 106916659-A, published on Jul. 4, 2017, Zhang et al. English Translation.*
CN 113174297-A, published on Jul. 27, 2021, Sun et al. English Translation.*

* cited by examiner

*Primary Examiner* — Lorna M Douyon
(74) *Attorney, Agent, or Firm* — Cooper Legal Group, LLC

(57) ABSTRACT

The present application relates to the technical field of daily cleaning and washing products, and particularly to a double layer detergent tablet and a preparation method thereof. The double layer detergent tablet includes a color absorbing fiber and a solid detergent adhered to the color absorbing fiber, the solid detergent includes the following components by mass percentage: 8-30% of polyvinyl alcohol, 10-40% of surfactant, 0.5-5% of polyvinylpyrrolidone, 1-5% of glycerin, 0.5-5% of water softener, 0.1-1% of plant essence, 14-79.9% of deionized water. The surfactant is a mixture of an anionic surfactant and a non-ionic surfactant; the anionic surfactant is a mixture of sodium coco-sulfate and sodium alpha-olefin sulfonate; and the non-ionic surfactant is a mixture of alkyl glycoside, fatty alcohol polyoxyethylene ether, isomeric alcohol polyoxyethylene ether and fatty acid methyl ester ethoxy compound.

11 Claims, No Drawings

DOUBLE LAYER DETERGENT TABLET AND PREPARATION METHOD THEREOF

CROSS-REFERENCE TO RELATED APPLICATION

The present application is based on and claims the priority benefit of China application No. 202111679839.9, filed on Dec. 31, 2021. The entirety of China application No. 202111679839.9 is hereby incorporated by reference herein and made a part of this specification.

TECHNICAL FIELD

The present application relates to the technical field of daily cleaning and washing products, and particularly to a double layer detergent tablet and a preparation method thereof.

BACKGROUND ART

In daily life, people often mix clothes of different colors together when washing clothes, so as to save time, which, however, would tend to cause a cross-color phenomenon between clothes of different colors. Especially, the cross-color phenomenon between new clothes is more serious, which brings great trouble to people's lives.

The reasons for the cross-color phenomenon between clothes of different colors washed together have been thoroughly studied at home and aboard, and it is believed that the main reason for the cross-color phenomenon is desorption and re-adsorption of dye during the washing process. In recent years, there are many liquid detergent products capable of preventing the cross-color phenomenon on the market. In order to achieve the purpose of removing stains and preventing the cross-color phenomenon, most of these products are made by adding strong anionic surfactant system and cationic components. However, the strong anionic surfactant system in this type of liquid detergent products tends to electrostatically adsorb the cationic components, which not only reduces the anti-cross-color function, but also greatly reduces the detergency effect of the liquid detergents products.

In view of the above related technology, it is believed that the liquid detergent products, composed of strong anionic surfactant system and cationic components with anti-cross-color function, capable of preventing the cross-color phenomenon on the market, do not have obvious effect in practical applications, and the detergency effect and anti-cross-color function thereof are still need to be improved.

SUMMARY

In order to improve the detergency, color-protecting and anti-cross-color ability of the detergent, the present application provides a double layer detergent tablet and a preparation method thereof.

In a first aspect, the present application provides a double layer detergent tablet, adopting the following technical solution:

the double layer detergent tablet includes a color absorbing fiber and a solid detergent adhered to the color absorbing fiber, in which the solid detergent includes the following components by mass percentage: 8-30% of polyvinyl alcohol, 10-40% of surfactant, 0.5-5% of polyvinylpyrrolidone, 1-5% of glycerin, 0.5-5% of water softener, 0.1-1% of plant essence, and 14-79.9% of deionized water; and the surfactant is a mixture of an anionic surfactant and a non-ionic surfactant; the anionic surfactant is a mixture of sodium coco-sulfate and sodium alpha-olefin sulfonate; and the non-ionic surfactant is a mixture of alkyl glycoside, fatty alcohol polyoxyethylene ether, isomeric alcohol polyoxyethylene ether and fatty acid methyl ester ethoxy compound.

By adopting the above technical solution, the present application combines a cationic color absorbing fiber that is hydrophobic and not easily decomposed with a detergent composed of an anionic surfactant and a non-ionic surfactant, such that the color absorbing property of the cationic fiber and the cleansing property of the anionic detergent are not influenced by the precipitation due to mutual adsorption of heterogeneous charges, meanwhile, the desorbed dye is quickly adsorbed on the color absorbing fiber, and not easily desorbed again and transferred to the fabric, thereby reducing discharging of the desorbed dye with cleaning water.

The nonionic polyvinylpyrrolidone and 1-vinyl-2-pyrrolidone/1-vinyl-1H-imidazole copolymer are added in the detergent and formulated with each other, so that the cross-color preventing agent components are not influenced by the anionic detergent components in the detergent, and achieve an maximized color absorbing property of the cross-color preventing agent to prevent a quick transfer of the faded dye on the fabric, so as to make up for the defect of quick transfer of dye particles not caught on the color absorbing fabric in time due to the mechanical rotation or clothing blocking. Therefore, the mixedly washed fabric has multiple effects of color protection, color fixation and cross-color preventing.

Meanwhile, the added polyvinylpyrrolidone has good anti-redeposition property to dirt, and cooperates with the surfactant components in the detergents to obtain a good cleaning property to heavy dirt, so as to achieve a dual washing effect of stain removal and anti-redeposition property.

In addition, because the cationic of the color absorbing fiber has strong absorbability to anionic stain washed down, the stain washed down cannot re-deposit on the fabric. The added polyvinylpyrrolidone are properly used with the color absorbing fiber to achieve a goal of good anti-redeposition property of stain.

In the present application, sodium coco-sulfate and sodium alpha-olefin sulfonate are formulated to be the anionic surfactant, and further formulated with the non-ionic surfactant, so that detergency of the formulated components on the fabric is significantly improved. Sodium coco-sulfate and sodium alpha-olefin sulfonate are formulated with the non-ionic surfactant, so that the national standard carbon black stained cloth has a better detergency, and achieves a stronger detergency than that of a non-ionic system. A cleaning effect of 1+1+1>3 is achieved, and the detergency obtained after the three compounds are formulated is greater than that of any component used alone.

In some embodiments, a mass ratio of sodium coco-sulfate to sodium alpha-olefin sulfonate is 3-7:1.

In some embodiments, a mass ratio of sodium coco-sulfate to sodium alpha-olefin sulfonate is 3:1, and a mass ratio of the anionic surfactant to the non-ionic surfactant is 4:1.

By adopting the above technical solution, the mass ratio of sodium coco-sulfate to sodium alpha-olefin sulfonates is controlled at 3:1, then the mass ratio of the anionic surfactants formulated by the two to the non-ionic surfactant is controlled at 4:1, so that an optimal formulation and synergistic effect is achieved, and the obtained detergent has an optimal detergency.

In some embodiments, the double layer detergent tablet further includes a bio-enzyme with a mass percentage of 0.1-3%, and the bio-enzyme is one or more selected from a group consisting of protease, amylase, lipase and cellulase; preferably, a bio-enzyme adopted in an embodiment of the present application is protease.

By adopting the above technical solution, protease, amylase, lipase, cellulase and combination thereof prepared by extracting from microbial fermentation are able to decompose the protein and other macromolecular substances in the dirt on the fabric to soluble amino acids and other small molecule substances, and change the insoluble substance as soluble substance, which has a good cleaning effect on dirt such as blood stains, sweat stains, milk stains, grease, starch, etc. that are difficult to clean in daily life.

In some embodiments, the polyvinyl alcohol has an average polymerization degree of 500-2000, and an average molecular weight of 20000-100000; preferably, the polyvinyl alcohol has an average polymerization degree of 500-700, and an average molecular weight of 25000-55000. By adopting the above technical solution, controlling the average polymerization degree and the average molecular weight of the polyvinyl alcohol is helpful for better cooperation between the polyvinyl alcohol and the surfactant system in the present application, thereby improving the detergency of the solid detergent tablets and the adhesion between the solid detergent tablets and the color absorbing fiber.

In some embodiments, sodium coco-sulfate has a carbon atom number of 12-18, sodium alpha-olefin sulfonate has a carbon atom number of 12-18, the alkyl glycoside has a carbon atom number of 8-18, the fatty alcohol polyoxyethylene ether has an EO addition number of 9, the fatty acid methyl ester ethoxy compound has a carbon atom number of 12-14.

Preferably, in a specific embodiment of the present application, sodium coco-sulfate adopted has a carbon atom number of 12-14; sodium alpha-olefin sulfonate has a carbon atom number of 12-14; the alkyl glycoside has a carbon atom number of 8-10; the fatty alcohol polyoxyethylene ether has an EO addition number of 9; and the fatty acid methyl ester ethoxy compound has a carbon atom number of 12-14.

By adopting the above technical solution, length of each molecular chain is controlled, so that the prepared detergent tablet has an optimal detergency and dissolution rate.

In some embodiments, the polyvinylpyrrolidone has a Mw of 25000-95000, and a K value of 15-30, and the polyvinylpyrrolidone is one selected from a group consisting of povidone K30 and HP66K; preferably, in a specific embodiment of the present application, the polyvinylpyrrolidone is HP66K (1-vinyl-2-pyrrolidone/1-vinyl-1H-imidazole copolymer).

In some embodiments, the polyvinylpyrrolidone has a Mw of 8000-100000.

In some embodiments, 1-vinyl-2-pyrrolidone/1-vinyl-1H-imidazole copolymer is non-ionic.

By adopting the above technical solution, the polyvinylpyrrolidone can interact with surfactant to form a surfactant polymer to adsorb complex, and has similar characteristics as micelles and can dissolve dyes. The above preferred polyvinylpyrrolidone class all can formulate and polymerize with the surfactant system, and has a good cross-color preventing function.

In some embodiments, the double layer detergent tablet further includes a detergent builder with a mass percentage of 0.1-1%, and the detergent builder is one or two selected from a group consisting of sodium carbonate and sodium bicarbonate.

By adopting the above technical solution, sodium carbonate/sodium bicarbonate is added, and generates carbon dioxide when the detergent slurry is heated for drying. Countless dense and small bubbles are formed on the surface of the detergent slurry, which is helpful for close fitting of color absorbing fibers, quick dissolution of products during washing fabric, and no-residue phenomenon under a fast-washing mode.

In some embodiments, the water softener is a mixture of sodium citrate, citric acid and tetrasodium glutamate diacetate.

By adopting the above technical solution, sodium citrate has good water solubility, excellent chelating ability to $Ca^{2+}$, $Mg^{2+}$ and other metal ions in the water, complete biodegradability, excellent dispersibility and anti-redeposition property for the stains. pH buffer with strong buffer capacity is formed by the formulation between sodium citrate and citric acid, which is helpful for PH stability of formula component. Added tetrasodium glutamate diacetate with good biodegradability forms a strong water quality chelating ability, which cooperates with the surfactant to obtain a better detergency.

In some embodiments, the water softener is a mixture of sodium citrate, citric acid and trisodium methylglycine diacetate.

In some embodiments, the water softener is a mixture of sodium citrate, citric acid and sodium iminodisuccinate.

In some embodiments, the water softener is a mixture of sodium citrate, citric acid and tetrasodium aspartate diacetate.

In a second aspect, the present application provides a preparation method of the double layer detergent tablet, adopting the following technical solution:

the double layer detergent tablet is prepared by the following steps:

S1, adding the polyvinyl alcohol, the polyvinylpyrrolidone and the deionized water into a mixer under stirring and heating, and keeping heating for a period of time until materials are completely swollen, then adding the water softener, detergent builder and non-ionic surfactant successively under evenly stirring, finally, adding the anionic surfactant and the essence under evenly stirring to obtain a detergent slurry;

S2, drying the detergent slurry preliminarily to prepare a semi-dried solid detergent; and S3, adhering the semi-dried solid detergent on the surface of the color absorbing fiber, drying the semi-dried solid detergent until being completely dried, and adding the bio-enzyme evenly to obtain the double layer detergent tablet.

By adopting the above technical solution, the solid detergent tablet can be prepared quickly, and the requirements for rotate speed, temperature, production equipment and other preparation conditions in preparing process are low, which is suitable for a large-scale production.

In some embodiments, in step S1, a temperature for heating is 85° C., and in step S2 and S3, a temperature for drying is 80-120° C.

By adopting the above technical solution, the detergent components have good dispersibility and stability at the above temperature parameters.

In summary, the present application has the following beneficial effects:

(1) in the present application, a traditional cationic cross-color preventing component is replaced by the polyvinylpyrrolidone, the detergent is dried preliminarily to form a solid tablet shape and combined with the color absorbing fiber, which can prevent a quick transfer of the faded dyes on the fabric, increase a quick color absorbing ability of the color absorbing fiber, and improve the color protecting and cross-color preventing effects of the detergent tablets;

(2) in the present application, sodium coco-sulfate and sodium alpha-olefin sulfonate are formulated to be an anionic surfactant, and further formulated with the non-ionic surfactant, so that the detergency of formula components to the fabric is obviously improved; and (3) in the present application, the mass ratio of sodium coco-sulfate to sodium alpha-olefin sulfonate is controlled at 3:1, then the mass ratio of the anionic surfactants formulated by the two to the non-ionic surfactant is controlled at 4:1, so that an optimal formulation and synergistic effect is achieved, and the obtained detergent has an optimal detergency.

DETAILED DESCRIPTION

The present application is further described in detail below in combination with the following examples.

In the present application, sources of part of the components and equipment in each example and comparative example were shown in the following table, other components and equipment not listed were commercially available.

| Components/ equipment/ reagents | Model/ Article No. | Manufacturers |
| --- | --- | --- |
| Polyvinyl alcohol | KD-CW088-20 | Sinopec Chongqing SVW Chemical CO., LTD |
| Polyvinylpyrrolidone | HP66K | BASF |
| Sodium coco-sulfate | K12 | Shandong Jujin Chemical Materials Co., Ltd |
| Glycerol | Glycerol | Shandong Xinqiye Environmental Protection Technology Co., Ltd |
| Sodium citrate | 266 | Henan Shengkun Chemical Products Co., Ltd |
| Citric acid | Citric acid monohydrate 656-665 | Henan Ruiyi Chemical Products Co., Ltd |
| Tetrasodium glutamate diacetate | GL-47-S | Shanghai Danning Chemical Co., Ltd |
| Bio-enzyme (protease) | Progress Uno 100L | Shanghai Hengchen Industrial Co., Ltd |
| Plant essence | Gardenia fragrance | Guangzhou Fenhao essence Co., Ltd |
| Vertical decontamination machine | RHLQIII type | China research institute of Daily Chemical Industry |
| Drum washing machine | EG8012HB86S | Haier |
| Impeller type washing machine | EB65M019 | Haier |
| National standard carbon black stained cloth | JB-01 | National surfactant detergent standardization center |
| National standard protein stained cloth | JB-02 | National surfactant detergent standardization center |
| National standard sebum stained cloth | JB-03 | National surfactant detergent standardization center |
| Standard laundry detergent | / | National surfactant detergent standardization center |
| Anhydrous calcium chloride AR | / | Damao chemical reagent factory |
| Magnesium chloride AR | / | Damao chemical reagent factory |

The color absorbing fiber used in the present application was prepared by the following steps: a 5 g/L of cationic cellulose ether aqueous solution was prepared, and pH was adjusted to 11 by sodium hydroxide. A viscose fiber was added, and reacted for 50 min at 100° C., then a polyquaternium salt viscose fiber was obtained. The polyquaternium salt viscose fiber was taken out and conventionally dried to obtain the color absorbing fiber.

In the present application, the specific test methods of detergency and cross-color preventing function for prepared samples of each example and comparative example were as follows:

Detergency Test

1. Preparing hard water: 16.70 g calcium chloride and 20.37 g magnesium chloride was weighted, deionized water was added to 10.0 L to obtain 2500 mg/Kg of the hard water. When in use, 1.0 L of the above hard water was added deionized water to 10.0 L to obtain 250 mg/Kg of the hard water.

2. Whiteness measurement:

2.1 JB-01 stained cloth, JB-02 stained cloth and JB-03 stained cloth were cut into a size of 6 cm*6 cm, and were classified into six groups each having a similar blackness. Each group of the test cloths was used for testing the performance of a same sample.

2.2 The test pieces were stacked in the same category. Whiteness values before and after washing were read by using a whiteness meter one by one at 457 nm. Two points were selected on both sides of the test cloths before washing (the two points on each side were center symmetrical to each other) and measured in terms of whiteness values, in which an average of four measurements was defined as whiteness F1 of the test cloth before washing. Two points were selected on both sides of the test cloths after washing (the two points on each side were center symmetrical to each other) and measured in terms of whiteness values, in which an average of four measurements was defined as whiteness F2 of the test cloth before washing.

3. Detergency Washing Test 3.1 The washing test was carried out in a vertical decontamination machine. Before the test, a stirring impeller, a working tank and a decontamination bathtub were numbered one by one and fixed to form a "working unit", and equipment were preheated to 30° C.±1° C. and kept for a period of time. During the test, 250 mg/kg hard water (which was preheated to about 30° C. in advance) was used to prepared samples separately as 0.2% test solution; the standard laundry detergent was prepared to a 0.2% test solution; and 1 L of each test solution was poured into corresponding decontamination bathtub. The bathtubs were positioned at corresponding locations and equipped with stirring impellers. A washing test temperature was kept at 30° C.±1° C. by adjusting equipment to prepare for the test.

3.2 each group of test pieces after testing the whiteness were correspondingly poured into each of the decontamination bathtubs; stirring was started; a speed for stirring was kept at 120 r/min; and a washing process was stopped after 20 min.

3.3 the test pieces in the decontamination bathtubs were poured into an inner bucket of a rinser together, and were drained. 1500 mL of running water was poured into the rinser, a lid of which was covered; a handle on the lid was turned; the inner barrel was rotated for 30 s; and then stopped. The rinsing water was drained, and 1500 mL of running water was added to perform a second rinsing. The rinsing water was drained, and the test pieces were manually dehydrated for 15 s (a speed for rotating is about 1800 r/min). The rinsed test pieces were taken out, hung for drying at room temperature, and tested for the whiteness F2 according to whiteness test method of the stained cloth before washing.

Whiteness difference (F2-F1) of each test cloth before and after washing was calculated by one-to-one correspondence, and a detergency of each group of the test cloths was calculated. Calculation was conducted based on different kinds of the test cloths, and a detergency R and detergency ratio P achieved by a detergent on individual stained cloths were determined as follow.

4. Calculation of Detergency Value of a Stained Cloth

The detergency value $Ri=\Sigma(F2i-F1i)/n$;

where:

i—Type ith stained test cloth;

F1i—spectral reflectance of the type ith stained test cloth before washing, %;

F2i—spectral reflectance of the type ith stained test cloth after washing, %;

n—effective content of each group of stained test cloth.

One decimal place was kept for the results.

5. Calculation of Detergency Ratio of Stained Cloths

The detergency ratio $Pi=R3i/R0i$ of a relative standard laundry detergent on the type ith stained cloth;

where:

R0i—detergency value of a standard laundry detergent, %;

R3i—detergency value for the sample.

One decimal place was kept for the results.

6. Determination of Detergency of a Detergent

When $Pi \geq 1.0$, it is determined that "the detergency of the sample to the type ith stained cloth is equal to or better than that of the standard laundry detergent", which is briefly referred to as "qualified detergency for the type ith stained cloth"; and When $Pi<1.0$, it is determined that "the detergency of the sample to the type ith stained cloth is inferior to that of the standard laundry detergent", which is briefly referred to as "unqualified detergency for the type ith stained cloth".

Cross-Color Preventing Performance Test

According to the preparing method and test equipment in the detergency test, the test samples and 1 L of hard water were added into the vertical decontamination machine, and one piece of blue cloth, one piece of red cloth and two pieces of white cloth, with a size of 6 cm×6 cm, sold in the market were added, and were washed for 25 min, then rinsed twice with clean water and then dried naturally.

Color differences of blue cloth, red cloth and white cloth before and after washing were measured. The smaller the color difference value of the white cloth, the better the cross-color preventing performance; the smaller the color difference value of the blue cloth and the red cloth, the better the color protecting effect.

EXAMPLE

Example 1

A double layer detergent tablet, in which each component and corresponding quality thereof were shown in table 1, was prepared by the following steps:

S1, the polyvinyl alcohol, the polyvinylpyrrolidone and the deionized water were added into a mixer, stirred and heated to 85° C., and kept for 50 min until materials were completely swollen, then the water softener and non-ionic surfactant were added and stirred evenly, finally, the anionic surfactant and essence were added and continuously stirred evenly to obtain the detergent slurry;

S2, the detergent slurry was dried preliminarily at 100° C. to prepare a semi-dried solid detergent; and S3, the semi-dried solid detergent was adhered on the surface of the color absorbing fiber, and dried until the semi-dried solid detergent was completely dried to obtain the double layer detergent tablet.

Examples 2-4

The difference of the double layer detergent tablets of Examples 2-4 from that of Example 1 lied in that, each component and corresponding quality thereof were shown in table 1.

Examples 5-7

The double layer detergent tablets of Examples 5-7, in which each component and corresponding quality thereof were shown in table 1, were prepared by the following steps:

S1, this step was same as step S1 of Example 1;

S2, this step was same as step S2 of Example 1;

S3, the semi-dried solid detergent is adhered on the surface of the color absorbing fiber, and dried until the semi-dried solid detergent was completely dried, and then the bio-enzyme was evenly added to obtain the double layer detergent tablet.

Example 8

The double layer detergent tablet of Example 8, in which each component and corresponding quality thereof were shown in table 1, was prepared by the following steps:

S1, the polyvinyl alcohol, the polyvinylpyrrolidone and the deionized water were added into the mixer, stirred and heated to 85° C., and kept for 50 min until materials were completely swollen, then the water softener, detergent builder and non-ionic surfactant were added and stirred evenly, finally, anionic surfactant and essence were added and continuously stirred evenly to obtain the detergent slurry;

S2, this step was same as step S2 of Example 1;

S3, this step was same as step S3 of Example 1;

TABLE 1 each component and quality (kg) thereof in Examples 1-6

| Examples | | 1 | 2 | 3 | 4 | 5 | 6 | 7 | 8 |
|---|---|---|---|---|---|---|---|---|---|
| Polyvinyl alcohol | | 8 | 18 | 30 | 8 | 8 | 18 | 30 | 8 |
| Anionic surfactant | Sodium coco-sulfate | 7 | 21 | 28 | 6 | 6 | 21 | 28 | 6 |
| | Sodium alpha-olefin sulfonate | 1 | 3 | 4 | 2 | 2 | 3 | 4 | 2 |
| Non-ionic surfactant | Alkyl glycoside | 0.5 | 1.5 | 2 | 0.5 | 0.5 | 1.5 | 2 | 0.5 |
| | Fatty alcohol polyoxyethylene ether | 0.5 | 1.5 | 2 | 0.5 | 0.5 | 1.5 | 2 | 0.5 |
| | Isomeric alcohol polyoxyethylene ether | 0.5 | 1.5 | 2 | 0.5 | 0.5 | 1.5 | 2 | 0.5 |
| | Fatty acid methyl ester ethoxy compound | 0.5 | 1.5 | 2 | 0.5 | 0.5 | 1.5 | 2 | 0.5 |
| Polyvinylpyrrolidone | | 0.5 | 2.5 | 5 | 0.5 | 0.5 | 2.5 | 5 | 0.5 |
| Glycerin | | 1 | 3 | 5 | 1 | 1 | 3 | 5 | 1 |
| Water softener | Sodium citrate | 0.35 | 2.25 | 3.5 | 0.35 | 0.35 | 2.25 | 3.5 | 0.35 |
| | Citric acid | 0.05 | 0.25 | 0.5 | 0.05 | 0.05 | 0.25 | 0.5 | 0.05 |
| | Tetrasodium glutamate diacetate | 0.1 | 0.5 | 1 | 0.1 | 0.1 | 0.5 | 1 | 0.1 |
| Detergent builder | Sodium carbonate | 0 | 0 | 0 | 0 | 0 | 0 | 0 | 0.05 |
| | Sodium bicarbonate | 0 | 0 | 0 | 0 | 0 | 0 | 0 | 0.45 |
| Bio-enzyme | | 0 | 0 | 0 | 0 | 0.1 | 1.5 | 3 | 0.1 |
| Plant essence | | 0.1 | 0.5 | 1 | 0.1 | 0.1 | 0.5 | 1 | 0.1 |
| Deionized water | | 79.9 | 43 | 14 | 79.9 | 79.8 | 41.5 | 11 | 79.3 |

COMPARATIVE EXAMPLE

Comparative Examples 1-3

The difference of the double layer detergent tablets of Comparative examples 1-3 from that of Example 1 lied in that, each component and corresponding quality thereof were shown in table 2.

Comparative Example 4

The difference of the double layer detergent tablet of Comparative example 4 from that of Example 1 lied in that, polyvinylpyrrolidone was replaced by same quality cationic guar gum.

TABLE 2 each component and quality (kg) thereof in Comparative examples 1-3

| Components | | Comparative examples 1 | 2 | 3 |
|---|---|---|---|---|
| Polyvinyl alcohol | | 8 | 8 | 8 |
| Anionic surfactant | Sodium coco-sulfate | 9 | 0 | 7.5 |
| | Sodium alpha-olefin sulfonate | 2 | 3 | 0 |
| Non-ionic surfactant | Alkyl glycoside | 0 | 1.5 | 0.6 |
| | Fatty alcohol polyoxyethylene ether | 0 | 1.5 | 0.6 |
| | Isomeric alcohol polyoxyethylene ether | 0 | 1.5 | 0.6 |
| | Fatty acid methyl ester ethoxy compound | 0 | 1.5 | 0.7 |
| Polyvinylpyrrolidone | | 0.5 | 0.5 | 0.5 |
| Glycerin | | 1 | 1 | 1 |
| Water softener | Sodium citrate | 0.35 | 0.35 | 0.35 |
| | Citric acid | 0.05 | 0.05 | 0.05 |
| | Tetrasodium glutamate diacetate | 0.1 | 0.1 | 0.1 |
| Detergent builder | Sodium carbonate | 0 | 0 | 0 |
| | Sodium bicarbonate | 0 | 0 | 0 |
| Bio-enzyme | | 0 | 0 | 0 |
| Plant essence | | 0.1 | 0.1 | 0.1 |
| Deionized water | | 78.9 | 80.9 | 79.9 |

Performance Test
Test One

The products prepared in Examples 1-8 and Comparative examples 1~4 were diluted to a concentration of 0.2%, a test concentration of the standard laundry detergent was 0.2%, the detergency of the products were tested and results were shown in table 3 below.

TABLE 3

Performance test results

| | Test concentration | JB-01 carbon black | JB-02 protein | JB-03 sebum | Test results |
|---|---|---|---|---|---|
| Standard laundry detergent | 0.2% | 1.00 | 1.00 | 1.00 | / |
| Example 1 | 0.2% | 1.16 | 1.24 | 1.55 | Qualified |
| Example 2 | 0.2% | 1.15 | 1.22 | 1.52 | Qualified |
| Example 3 | 0.2% | 1.15 | 1.23 | 1.53 | Qualified |
| Example 4 | 0.2% | 1.19 | 1.28 | 1.58 | Qualified |
| Example 5 | 0.2% | 1.21 | 4.32 | 1.85 | Qualified |
| Example 6 | 0.2% | 1.15 | 3.58 | 1.81 | Qualified |
| Example 7 | 0.2% | 1.15 | 3.64 | 1.82 | Qualified |

TABLE 3-continued

Performance test results

| | Test concentration | JB-01 carbon black | JB-02 protein | JB-03 sebum | Test results |
|---|---|---|---|---|---|
| Example 8 | 0.2% | 1.29 | 4.38 | 1.95 | Qualified |
| Comparative example 1 | 0.2% | 1.00 | 1.00 | 1.20 | Qualified |
| Comparative example 2 | 0.2% | 1.04 | 1.00 | 1.03 | Qualified |
| Comparative example 3 | 0.2% | 1.04 | 1.01 | 1.22 | Qualified |
| Comparative example 4 | 0.2% | 1.13 | 1.20 | 1.40 | Qualified |

Comparing the test results of example 1 and Comparative examples 1-3, it can be seen that, the detergency of example 1 was the better and superior to that of the Comparative examples 1-3. It can be indicated that, when the sodium coco-sulfate and sodium alpha-olefin sulfonate were formulated to make the anionic surfactant, further formulated with the non-ionic surfactant composed of alkyl glycoside, fatty alcohol polyoxyethylene ether, isomeric alcohol polyoxyethylene ether and fatty acid methyl ester ethoxy compound, the detergency was superior to that of any surfactant used alone. Moreover, each surfactant in above surfactant system had cooperation and synergistic effect, and the detergency was obviously improved.

Comparing the test results of examples 1-4, it can be seen that, example 4 has the highest detergency value, and Example 1 has a slightly worse detergency. It can be indicated that, in the present application, when a formulation ratio between the sodium coco-sulfate and sodium alpha-olefin sulfonate was controlled at 3:1, further a formulation ratio between the two and the non-ionic surfactant composed of alkyl glycoside, fatty alcohol polyoxyethylene ether, isomeric alcohol polyoxyethylene ether and fatty acid methyl ester ethoxy compound was controlled at 4:1, the obtained detergent tablet has the better detergency.

Comparing the test results of examples 2-7, it can be seen that, Examples 5-7 added with protein have better detergency than that of examples 2-4, in particular, the detergency to protein stains reached about 3-4 times that of examples 2-4. It can be indicated that, after the protease component was added, the detergency to JB-02 protein stained cloth was improved and the improving effect was obvious. However, the detergency to JB-01 carbon black stained cloth and JB-03 sebum stained cloth was not obviously improved, meanwhile, the specificity of the enzyme formulation for washing was confirmed.

Comparing the test results of examples 5 and 8, it can be seen that, the detergency of example 8 added with the detergent builder was improved. It can be indicated that, the detergent builder was helpful to the cleaning and detergency of the detergent tablets. A possible reason was that the detergent tablet causes countless of dense small bubbles during preparing the detergent tablet, which facilitates the rapid disintegration of the detergent tablet in water, improving the washing effect.

Test Two

The products prepared in Examples 1-8 and Comparative examples 1~4 were diluted to a concentration of 0.025%, a test concentration of the standard laundry detergent was 0.2%, the detergency of the products were tested and results were shown in table 4 below.

TABLE 4 test results of detergency

| | Test concentration | JB-01 carbon black | JB-02 protein | JB-03 sebum | Test results |
|---|---|---|---|---|---|
| Standard laundry detergent | 0.2% | 1.00 | 1.00 | 1.00 | / |
| Example 1 | 0.025% | 0.89 | 0.93 | 1.05 | Unqualified |
| Example 2 | 0.025% | 0.89 | 0.92 | 1.04 | Unqualified |
| Example 3 | 0.025% | 0.88 | 0.91 | 1.01 | Unqualified |
| Example 4 | 0.025% | 0.90 | 0.95 | 1.08 | Unqualified |
| Example 5 | 0.025% | 1.17 | 3.91 | 1.68 | Qualified |
| Example 6 | 0.025% | 1.11 | 3.12 | 1.35 | Qualified |
| Example 7 | 0.025% | 1.12 | 3.13 | 1.37 | Qualified |
| Example 8 | 0.025% | 1.09 | 2.99 | 1.57 | Unqualified |
| Comparative example 1 | 0.025% | 0.71 | 0.72 | 0.87 | Unqualified |
| Comparative example 2 | 0.025% | 0.72 | 0.75 | 0.86 | Unqualified |
| Comparative example 3 | 0.025% | 0.75 | 0.79 | 0.94 | Unqualified |
| Comparative example 4 | 0.025% | 0.85 | 0.86 | 1.00 | Unqualified |

Comparing the test results of table 3 and 4, it can be seen that, under a condition that the +8 test products was diluted by 8 times (0.025%) and the standard laundry detergent was maintained at a test concentration of 0.2%, the detergency of the Examples 1-5 and Comparative examples 1-6 to JB-01 carbon black stained cloth, JB-02 protein stained cloth and JB-03 sebum stained cloth were obviously decreased. It was also consistent with conventional recognition that the detergency of detergent will be decreased after dilution. However, comparing with the test results of Examples 6-8 added with protease, it can be surprisedly found that, under the condition that the standard laundry detergent was maintained at a test concentration of 0.2%, the samples of the Examples 5-7 were diluted by 8 times, the detergency to JB-01 carbon black stained cloth and JB-03 sebum stained cloth were still qualified, and the detergency were not decreased compared with that before dilution. It can be indicated that, the solid detergent tablet after the protease was added in the present application not only had better detergency to JB-02 protein stained cloth, but also had an greater improvement of detergency to the JB-01 carbon black stained cloth and JB-03 sebum stained cloth.

Test Three

The products prepared in Examples 1-8 and Comparative examples 1-4 were tested for the cross-color preventing function, and results were shown in table 5 below.

TABLE 5 test results of the cross-color preventing function

| | Color difference of white cloth | Color difference of blue cloth | Color difference of red cloth |
|---|---|---|---|
| Standard laundry detergent | 8.31 | 8.65 | 8.98 |
| Example 1 | 1.99 | 1.02 | 0.88 |
| Example 2 | 1.89 | 1.05 | 0.85 |
| Example 3 | 1.91 | 0.91 | 0.79 |
| Example 4 | 1.56 | 0.84 | 0.58 |
| Example 5 | 1.46 | 0.77 | 0.45 |
| Example 6 | 1.78 | 1.01 | 0.84 |
| Example 7 | 1.82 | 0.84 | 0.75 |
| Example 8 | 1.42 | 0.75 | 0.35 |
| Comparative | 2.34 | 1.54 | 1.01 |

TABLE 5-continued test results of the cross-color preventing function

| | Color difference of white cloth | Color difference of blue cloth | Color difference of red cloth |
|---|---|---|---|
| example 1 Comparative example 2 | 2.05 | 1.48 | 0.99 |
| Comparative example 3 | 2.10 | 1.51 | 0.89 |
| Comparative example 4 | 3.61 | 2.64 | 1.82 |

Comparing the test results of Examples 1-8 and the standard laundry detergent, it can be seen that, the test results of color differences of white cloth and colored cloth were far less than that of the standard laundry detergent. It can be indicated that, the detergent tablets prepared by the formulation and preparation method in the present application had better color protecting and cross-color preventing function.

Comparing the test results of Example 1 and Comparative examples 1-3, it can be seen that, the color differences of white cloth and colored cloth of the Example 1 was far less than that of the Comparative examples 1-3. It can be indicated that, when the sodium coco-sulfate and sodium alpha-olefin sulfonate were formulated to make the anionic surfactant, further formulated with the non-ionic surfactant composed of alkyl glycoside, fatty alcohol polyoxyethylene ether, isomeric alcohol polyoxyethylene ether and fatty acid methyl ester ethoxy compound, the cross-color preventing function was superior to that of any surfactant used alone. Moreover, each surfactant in above surfactant system had cooperation and synergistic effect, and the cross-color preventing function was obviously improved.

Comparing the test results of Examples 1-4, it can be seen that, color differences of white cloth and colored cloth of the Example 4 was minimum. It can be indicated that, in the present application, when the formulation ratio of sodium coco-sulfate to sodium alpha-olefin sulfonate was controlled at 3:1, further a formulation ratio between the two and the non-ionic surfactant composed of alkyl glycoside, fatty alcohol polyoxyethylene ether, isomeric alcohol polyoxyethylene ether and fatty acid methyl ester ethoxy compound was controlled at 4:1, the cross-color preventing function of the obtained detergent tablet was better.

Comparing the test results of Examples 1 and 4, it can be seen that, the color differences of white cloth and colored cloth of the Example 1 were far less than that of the Comparative example 4. It can be indicated that, in the present application, when the polyvinylpyrrolidone was used as cross-color preventing agent, and cooperated with a surfactant system composed with an anionic surfactant and a non-ionic surfactant, the problem of poor color protecting and cross-color preventing function after cationic cross-color preventing agent being formulated with non-ionic surfactant was indeed solved. In addition, the color protecting and cross-color preventing function of the detergent prepared in the present application were improved obviously by means of appropriate proportion of components.

The above are the preferred examples of the present application, which are not intended to limit the protection scope of the present application. Therefore, all equivalent changes made according to the structure, shape and principle of the present application should be covered within the protection scope of the present application.

What is claimed is:

1. A double layer detergent tablet, comprising a color absorbing fiber and a solid detergent adhered to the color absorbing fiber, wherein the solid detergent comprises the following components by mass percentage: 8-30% of polyvinyl alcohol, 10-40% of surfactant, 0.5-5% of polyvinylpyrrolidone, 1-5% of glycerin, 0.5-5% of water softener, 0.1-1% of plant essence, and 14-79.9% of deionized water; and
   wherein the surfactant is a mixture of an anionic surfactant and a non-ionic surfactant; the anionic surfactant is a mixture of sodium coco-sulfate and sodium alpha-olefin sulfonate; the non-ionic surfactant is a mixture of alkyl glycoside, fatty alcohol polyoxyethylene ether, isomeric alcohol polyoxyethylene ether and fatty acid methyl ester ethoxy compound; and wherein the water softener is a mixture of sodium citrate, citric acid and tetrasodium glutamate diacetate.

2. The double layer detergent tablet according to claim 1, wherein a mass ratio of the sodium coco-sulfate to the sodium alpha-olefin sulfonate is 3-7:1.

3. The double layer detergent tablet according to claim 1, wherein a mass ratio of the sodium coco-sulfate to the sodium alpha-olefin sulfonate is 3:1, and a mass ratio of the anionic surfactant to the non-ionic surfactant is 4:1.

4. The double layer detergent tablet according to claim 1, wherein the double layer detergent tablet further comprises a bio-enzyme, and the bio-enzyme is one or more selected from a group consisting of protease, amylase, lipase and cellulase.

5. The double layer detergent tablet according to claim 4, wherein the bio-enzyme has a mass percentage of 0.1-3% in the double layer detergent tablet.

6. The double layer detergent tablet according to claim 1, wherein the polyvinyl alcohol has an average polymerization degree of 500-2000, and an average molecular weight of 20000-100000.

7. The double layer detergent tablet according to claim 1, wherein the sodium coco-sulfate has a carbon atom number of 12-18; the sodium alpha-olefin sulfonate has a carbon atom number of 12-18; the alkyl glycoside has a carbon atom number of 8-18; the fatty alcohol polyoxyethylene ether has an ethylene oxide (EO) addition number of 9; and the fatty acid methyl ester ethoxy compound has a carbon atom number of 12-14.

8. The double layer detergent tablet according to claim 1, wherein the polyvinylpyrrolidone has a molecular weight of 25000-95000, and a K value of 15-30.

9. The double layer detergent tablet according to claim 1, wherein the polyvinylpyrrolidone has a molecular weight of 8000-100000.

10. The double layer detergent tablet according to claim 1, wherein the double layer detergent tablet further comprises a detergent builder, and the detergent builder is one or two selected from a group consisting of sodium carbonate and sodium bicarbonate.

11. The double layer detergent tablet according to claim 10, wherein the detergent builder has a mass percentage of 0.1-1%.

* * * * *